United States Patent
Falkenberg et al.

(10) Patent No.: US 12,539,963 B2
(45) Date of Patent: Feb. 3, 2026

(54) METHOD FOR CONTROLLING A TRANSITION OF A VERTICAL TAKE-OFF AND LANDING AIRCRAFT FROM HOVER FLIGHT TO CRUISE FLIGHT AND VICE VERSA

(71) Applicant: Archer Aviation Inc., San Jose, CA (US)

(72) Inventors: Valentin Falkenberg, Wessling (DE); Tiago Lima, Wessling (DE)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/462,784

(22) Filed: Sep. 7, 2023

(65) Prior Publication Data
US 2024/0076037 A1    Mar. 7, 2024

(30) Foreign Application Priority Data
Sep. 7, 2022  (EP) .................................. 22194296

(51) Int. Cl.
*B64C 29/00* (2006.01)
*B64C 19/00* (2006.01)
*B64D 27/24* (2024.01)

(52) U.S. Cl.
CPC .......... *B64C 29/0033* (2013.01); *B64C 19/00* (2013.01); *B64D 27/24* (2013.01)

(58) Field of Classification Search
CPC ..... B64C 29/00; B64C 15/02; B64C 29/0016; B64C 20/0025; B64C 29/0075; B64C 9/38
See application file for complete search history.

(56) References Cited

U.S. PATENT DOCUMENTS

| D874,382 S | 2/2020 | Wiegand |
| 2004/0026563 A1 | 2/2004 | Moller |
| 2014/0097290 A1* | 4/2014 | Leng ........................ B60L 58/12 244/6 |
| 2017/0203839 A1* | 7/2017 | Giannini ................. B64C 39/12 |

(Continued)

FOREIGN PATENT DOCUMENTS

WO    2017/123699 A1    7/2017

OTHER PUBLICATIONS

European Search Report and Opinion for Application No. 22194296.4 dated Feb. 14, 2023, 13 pages.

(Continued)

*Primary Examiner* — Joshua D Huson
*Assistant Examiner* — Shanna Danielle Glover
(74) *Attorney, Agent, or Firm* — Finnegan, Henderson, Farabow, Garrett & Dunner, LLP

(57) ABSTRACT

During the transition of a vertical take-off and landing aircraft from hover flight to cruise flight and vice versa, a method for controlling this transition is configured to push propulsion units of the VTOL aircraft through an unstable flow condition zone within a predetermined time period. Each propulsion unit is mounted to a mounting portion of the aircraft in a movable manner about at least one degree of freedom and comprises a flap serving as a lifting and control surface and at least one engine connected with the flap, and each propulsion unit receives command signals for flap angle and engine speed or speeds so that each propulsion unit generates a thrust force and/or a lift force.

16 Claims, 4 Drawing Sheets

(56) References Cited

U.S. PATENT DOCUMENTS

2021/0206487 A1* 7/2021 Iqbal .................. B64C 29/0083
2021/0303004 A1* 9/2021 Yüksel .................. B64C 13/16
2021/0331791 A1* 10/2021 Geuther ............. B64C 29/0025

OTHER PUBLICATIONS

European Communication pursuant to Article 94(3) EPC for European Application No. 22194296.4, dated Jan. 3, 2025, 6 pages.
International Search Report for Application No. PCT/EP2023/073829 dated Oct. 26, 2023, 3 pages.
International Written Opinion for Application No. PCT/EP2023/073829 dated Oct. 26, 2023, 10 pages.

\* cited by examiner

METHOD FOR CONTROLLING A TRANSITION OF A VERTICAL TAKE-OFF AND LANDING AIRCRAFT FROM HOVER FLIGHT TO CRUISE FLIGHT AND VICE VERSA

PRIORITY CLAIM

This application claims the benefit of the filing date of European Patent Application Serial No. 22194296.4, filed Sep. 7, 2022, for "METHOD FOR CONTROLLING A TRANSITION OF A VERTICAL TAKE-OFF AND LANDING AIRCRAFT FROM HOVER FLIGHT TO CRUISE FLIGHT AND VICE VERSA," the disclosure of which is incorporated herein in its entirety by this reference.

TECHNICAL FIELD

The present disclosure relates to a method for controlling a transition of a vertical take-off and landing (VTOL) aircraft, in particular, electric vertical take-off and landing (eVTOL) aircraft, from hover flight to cruise flight and vice versa. It further relates to an electronic flight control system (EFCS) configured to perform such a method.

BACKGROUND

Active flap control can allow a VTOL aircraft to transition from vertical hover mode to horizontal cruise mode and vice versa. This includes not only realizing the transition through the flaps, but also controlling the aircraft during the transition with these very flaps.

The eVTOL aircraft designed by the Applicant (see U.S. Pat. No. D874,382 S) uses a propulsion system with a plurality of electric ducted fans, which are mounted on individually controllable flaps. The whole propulsion units (consisting of flaps with fans mounted on them) are not only used for lift generation during vertical take-off and landing, and thrust generation in cruise, but also to control each axis of the eVTOL aircraft via thrust vectoring throughout the entire flight. The propulsion units make the flight control system efficient and, due to the amount of thrust required for vertical take-off, lead to high control authority for all the different flight phases.

The propulsion units, which only receive two signals (fan speed and flap angle commands), are the only actuators required by the EFCS and therefore avoid traditional control surfaces like ailerons, elevators, or rudders. For vertical take-off and landing, the propulsion units are all pointed downwards in a vertical position and after approximately ten seconds of hover flight, when the eVTOL aircraft reaches the initial altitude, they slowly transition into a horizontal position and thereby accelerate the aircraft forward. In cruise flight, all the aerodynamic lift is generated by the standard lifting surfaces (i.e., the wings, including the propulsion units) and the main body. During landing, the propulsion units transition back into the vertical position.

The transition from hover to cruise flight and vice versa is a complicated process in terms of aerodynamics and mechanics. In addition, complex aerodynamic interactions disrupt the flow pattern during the transition from the hover position to the cruise flight position, causing excessive energy spent, which may dramatically reduce the energy of battery of an eVTOL aircraft.

Therefore, the transition between hover and cruise flight continues to be considered one of the biggest control challenges for VTOL aircraft, in particular, eVTOL aircraft. To date, existing VTOL aircraft have addressed this challenge in an unsatisfying manner.

Consumption of robustness margins (compromised safety margins) and loss of control are typically the result of uncertainties on the control effectiveness, which are associated to the uncertainties on the flow condition of the aerodynamic control effectors, such as rudders, elevators, flaps, ailerons, etc. Over a wide range of control effector conditions, the state of the airflow may be either attached to or separated from the control effector surface. If exposed to those uncertainties, the flight control laws tuning is forced to be a compromising trade-off in order to account for both possibilities. However, dependent on the uncertainties and characteristics, a feasible trade-off might not even exist.

There is also evidence of emergence of limit cycle oscillations (LCO) that are induced by control effectors reacting to their own flow transition disturbance, thus causing another flow transition in the opposite direction. LCO not only cause significant challenges in flight control of VTOL aircraft, but can potentially lead to structural damage and catastrophic failures.

Considering the above, there is a "forbidden zone" of control effector conditions, where steady-state operation should be avoided due to the uncertainties related to the state of the airflow (attached or separated). There are several established strategies to deal with this "forbidden zone" associated with the aerodynamic transition of the lift generating surfaces, but they all have different, sometimes serious, drawbacks.

Due to the reduced controllability during the transition phase, many aircraft (e.g., tilt rotor aircraft, Boeing V-22 Osprey) are forced to maneuver through the transition phase dynamically by using all control effectors, thus imposing limitations on the operation of the aircraft and leading to large aircraft level transients induced by the aerodynamic disturbances caused by the airflow on the lift generating surfaces transitioning from separated flow (during hover flight) to attached flow (during cruise flight) and vice versa. Non-intuitive aircraft behavior and reduced aircraft handling characteristics are the result of these operational limitations and large transients. Other aircraft show a reduced cruise flight efficiency as a consequence of the aircraft design being compromised in favor of the transition capability.

Compound aircraft concepts (e.g., Piasecki 16H Pathfinder) are known, where the thrust generation at low speed flight is largely decoupled from the aerodynamic lift generation in forward flight. Aerodynamic lift generating surfaces are aligned with the free stream from very low velocities onward. In this way, the airflow is attached down to low velocities causing small aerodynamic transition disturbances. However, the associated drawbacks are the adverse impact on weight (large dead weight in both hover and cruise flight) and the low aerodynamic cruise flight efficiency.

Moreover, there are several passive and active ways to control boundary layer separation, such as vortex generators, boundary layer trips, suction and ejection devices, etc. In particular, open propellers distributed along the wings can be used to energize the boundary layer on the lift generating surfaces' suction side. In this way, flow transition effects can be shifted to low velocities, reducing the absolute aerodynamic force disturbances induced by the flow transition. However, the associated drawbacks are the negative impact on noise generation, cruise flight efficiency (rotor blade tip losses) and safety (blade-off containment).

BRIEF SUMMARY

In view of the foregoing, it is an object of the present disclosure to provide an efficient method for controlling a transition of a VTOL aircraft from hover flight to cruise flight and vice versa.

According to the present disclosure, this object is achieved by providing a method in accordance with independent claim 1. Further advantageous features, aspects and details of the present disclosure are evident from the dependent claims.

In particular, a method according to the present disclosure is a method for controlling a transition of a vertical take-off and landing aircraft from hover flight to cruise flight and vice versa, the aircraft comprising a plurality of individually controllable propulsion units, wherein each propulsion unit is mounted to a mounting portion of the aircraft in a movable manner about at least one degree of freedom and comprises a flap serving as a lifting and control surface and at least one engine connected with a flap, and each propulsion unit receives command signals for flap angle and engine speed or speeds so that each propulsion unit generates a thrust force and/or a lift force, wherein during the transition from hover flight to cruise flight and vice versa the method is configured to push the propulsion units through an unstable flow condition zone within a predetermined time period.

The term "unstable flow condition zone" is of central importance to the present disclosure. This unstable flow condition zone is also referred to below as the "forbidden zone." It defines a zone of flap angles where there is a transition regime with unstable/uncertain flow conditions. The flow conditions may be a separated flow condition, where the airflow on the suction side of the flap is stalled, or an attached flow condition, where the airflow on the suction side of the flap is attached to the flap surface.

It is also important to distinguish between flow transition on the one hand and flight phase transition on the other. The flow transition designates the transition from a separated (operating) regime (with a separated flow condition) to an attached (operating) regime (with an attached flow condition) and vice versa. However, the flight phase transition is essentially the gradual change in flight state from hover to cruise and vice versa.

Strictly speaking, the airflow is attached to the suction side of the flaps in both hover and cruise flight. However, when the flap angle is moved from a hover position to a cruise position, the flow on the flaps separates at very low air speeds. Due to the associated low dynamic pressure, the associated implications on the generated aerodynamic forces are negligible such that these flow separation effects are not of concern. For the sake of simplicity, the aircraft in hover flight is therefore considered being separated at all times.

It is noted that the term "engine speed" should also be understood as "fan speed" or "rotor speed" when the VTOL aircraft uses a fan or a rotor (e.g., driven by a turbine through a gearbox) as an engine.

According to the present disclosure, in a flight phase transition between the vertical hover phase and the horizontal cruise phase, the propulsion units are either in a separated operating regime (airflow fully separated from the surface of the flap) or in an attached operating regime (airflow attached to the surface of the flap). Consequently, also in this flight phase transition, the propulsion units are never steadily operating within a forbidden zone, which is a range of flap angle and fan speed combinations, where both separated and attached flow is possible.

The exact flap angle condition where the airflow transitions from one flow regime to the other is primarily dependent on the air speed, the engine mass flow rate, the angle of attack, and the air density. The control logic for pushing the propulsion units through the flow transition regime adapts to changes in those conditions in real-time.

Advantageously, this means that each propulsion unit operates in an operating regime, in which its flow condition is either separated or attached, but never experiences the uncertainty of the flow condition within the forbidden zone of the flight phase transition regime.

In a preferred embodiment, one or more propulsion units or groups of propulsion units are consecutively pushed through the unstable flow condition zone.

Thus, flow transition is accomplished not by dynamically maneuvering the aircraft through the flight phase transition as a whole (using all control effectors), but by pushing (maneuvering) the control effectors (i.e., the propulsion units) through the transition regime consecutively. Consecutively means that propulsion units or groups of propulsion units are pushed (maneuvered) one at a time in a specific order (sequence) through the unstable zone of flap angles (forbidden zone) (where there is a flow transition regime with uncertain flow conditions). By means of the consecutive propulsion unit push events, even though the propulsion units avoid steady operation within a critical flow transition regime (where flow may be attached or separated or switching from one to the other), the aircraft is enabled to steadily operate at any flight condition inside the flight phase transition regime.

In a further preferred embodiment, the pushing of a propulsion unit through the unstable flow condition zone is performed such that the flap angle of the propulsion unit has an adequate flow transition margin from the unstable flow condition zone, which is a flap angle distance of +/−2 to 10°, preferably +/−4 to 8°, most preferably +/−6 to 7° from the upper limit or lower limit of the unstable flow condition zone corresponding to a flow separation or attachment point.

In this way, the pushing of a propulsion unit ensures that any attached or separated operating condition has an adequate flow transition margin, which is a distance from a flow separation point or flow attachment point assuming that the conditions of any other dependencies of the flow transition point than the flap angle would remain the same as the present ones. Therefore, the method for controlling the transition of a VTOL aircraft ensures that an attached operating regime is at an appropriate distance from the flow separation point and that a separated operating regime is at an appropriate distance from the flow attachment point. Both distances are referred to in this document as "flow transition margins."

Preferably, the push-through movement is triggered by the flow transition margin expressed as a function of the flap angle. However, the push-through movement can alternatively be triggered as a function the operating condition of the propulsion unit, for example, being characterized by the engine speed (RPM) and/or the thrust level and/or the engine torque and/or the electrical current driving the engine motor.

In a still further preferred embodiment, the pushing of a propulsion unit through the unstable flow condition zone is achieved by dynamically decreasing or increasing the flap angle.

A propulsion unit is pushed through the forbidden zone of the transition regime (with uncertain flow conditions) by dynamically reducing the flap angle when accelerating from hover to cruise, or by dynamically increasing the flap angle when decelerating from cruise to hover. Such a push-through event can be triggered at a specific true air speed, or as a combined function of air speed and control authority demand or simply as a function of the distance from the expected flow transition condition.

In yet a further preferred embodiment, the pushing of a propulsion unit through the unstable flow condition zone is achieved by dynamically increasing or decreasing the respective engine speed or speeds and thus dynamically increasing or decreasing the mass flow rate in the propulsion unit.

Alternatively, or preferably additionally, the mass flow rate of the propulsion unit, controlled by the speed(s) of the engine(s) in the propulsion unit, can be used as a parameter to dynamically push the propulsion unit through the unstable flow condition zone (forbidden zone of the transition regime), in which the flow conditions have proved particularly difficult to compute.

It is preferred to achieve the pushing of propulsion units during the transition from hover flight to cruise flight or vice versa by using a sequence of push-through configurations, each push-through configuration being characterized by a certain allocation of propulsion units to the separated flow regime and the attached flow regime.

Therefore, the term "push-through configuration" defines a configuration, in which the aircraft's propulsion units, based on their flap angles and engine speeds, are, with sufficient certainty, either in an attached operating regime (in which the airflow is attached to the respective propulsion unit) or in a separated operating regime (in which the airflow is separated from the respective propulsion unit).

In the above, it is preferable that the sequence of push-through configurations corresponds to a gearbox-like sequence in which the propulsion units or groups of the propulsion units of the aircraft are pushed-through one after the other in a specific order and/or direction, in particular, by starting with propulsion units located further inboard and continuing with propulsion units located further outboard and/or vice versa.

This specific order and/or direction is driven by the natural tendency of flaps to attach/detach, which in turn is dependent on the flow field around the aircraft and in case of a canard aircraft design is significantly influenced by the canard tip vortex.

In the above, it is preferable that a change in push-through configuration by means of the pushing is triggered as a function of the flow transition margins of both the group of propulsion units in the separated operating regime and the group of propulsion units in the attached operating regime.

For example, during forward transition from hover to cruise, the distance between the propulsion unit operating point and a flow attachment point decreases. Before this distance falls below a certain limit value, a push-through configuration change (push-through event) is triggered such that the new propulsion unit operating point has an adequate distance from the flow separation point.

Preferably, the pushing of propulsion units or groups of propulsion units from the separated operating regime to the attached operating regime or vice versa is triggered symmetrically about the longitudinal center line of the aircraft in order to minimize lateral-directional disturbances.

Further preferably, the pushing of propulsion units or groups of propulsion units from the separated operating regime to the attached operating regime or vice versa is coupled on the canards and the main wings of the aircraft so as to balance transition-induced pitch disturbances.

BRIEF DESCRIPTION OF THE DRAWINGS

The above and other features of the present disclosure, and the manner of obtaining them, will become more apparent and the present disclosure itself will be better understood by reference to the following description of embodiments of the present disclosure taken in conjunction with the accompanying drawings, wherein.

DETAILED DESCRIPTION

Figure 4:
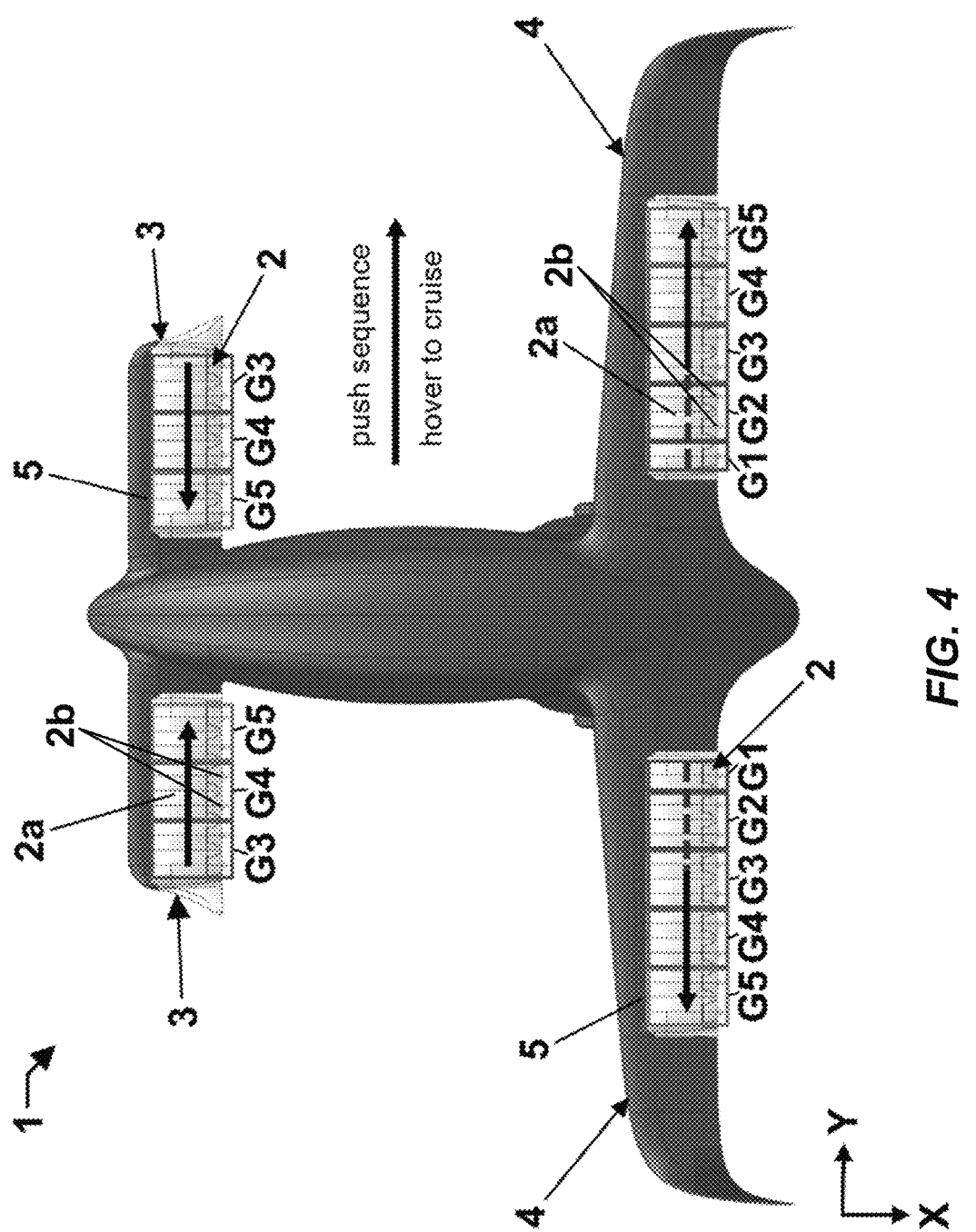
FIG. 4 is a top view of an eVTOL aircraft to which a control method according to the present disclosure is applied.

The illustrated exemplary embodiment of the present disclosure is concerned with realizing the transition capability of a distributed propulsion eVTOL aircraft 1 with engines in the form of electric ducted fans 2b being mounted on the lift generating aerodynamic surfaces of flaps 2a. Such an aircraft 1 is shown in FIG. 4 in a top view. The propulsion system consists of sixteen individually controllable flaps 2a, which also serve as lifting and control surfaces, and each flap 2a contains one or two engines (electric ducted fans 2b). A total of thirty ducted fans 2b are embedded in a 2:3 ratio on the canard 3 to main wing 4. Embedding the ducted fans 2b into the wings 3, 4 eliminates the need for dedicated nacelles, reducing weight and minimizing aerodynamic drag loss. The flap 2a is rotated by an integrated servo unit, which can rotate the whole propulsion unit 2, consisting of the flap 2a and the fan or ducted fans 2b mounted thereon, for controllability during hover and cruise flight. The propulsion units 2 are mounted to a mounting portion 5 of the aircraft 1 and only receive two command signals, relating to engine (fan) speed(s) and flap angle $\delta_f$, by which the aircraft 1 can be controlled throughout the flight envelope via thrust vectoring and generation of aerodynamic forces and moments.

It is highly desirable that the design of such an aircraft 1 be optimized for cruise flight efficiency without imposing limitations to the operation of the aircraft 1, while satisfying the requirements for aircraft level transients as well as robustness margins during the transition phase from hover to cruise flight and vice versa.

Transition from hover flight to cruise flight and vice versa is implemented by controlling the propulsion units 2. This means that the transition from hover flight to cruise flight and vice versa is made via the propulsion units 2 (flaps 2a with ducted fans 2b mounted on them and driven by an integrated electric engine). In essence, therefore, there are two very general principles: i) realization of the flow transition by the propulsion units 2; and ii) control of the aircraft 1 during the flow transition with the very same propulsion units 2.

It is important to recognize that the flow condition on the propulsion units 2/lift generating surfaces is not only a function of flap angle $\delta_f$ but also a function of non-dimensional mass flow rate (non-dimensional engine operating point) and angle of attack. Due to the non-dimensionalization of the mass-flow rate, the dependency on air speed and air density is inherently captured. Attached flow may face flow separation due to a flap angle increase, or an engine mass flow rate decrease, or a combination of both. In a similar way, separated flow may face flow attachment due to a flap angle decrease, or an engine mass flow rate increase, or a combination of both. As a consequence, the flap angle difference between two aircraft configurations required to ensure adequate flow transition margins in both regimes may be combined with a difference in the fan speeds (engine speeds) of both separated and attached propulsion units 2. Angle of attack changes have a similar impact on the flow condition as flap angle changes. An increase/decrease in angle of attack increases/decreases the "effective" flap angles relative to the freestream.

FIGS. 1A to 2B represent a schematic visualization of the control effector states for forward and backward transition. These FIGS. 1A to 2B are indicative of the impact of control authority demand on push-through conditions. It is to be noted in this regard that the calibrated air speed $V_{CAS}$ is just used for the sake of a more intuitive visualization, but not used as a push-through criterion. Rather, push-through events are triggered as a function of the flow transition margins $\delta_{f,attachment}$, $\delta_{f,separation}$ expressed as a function of the flap angle $\delta_f$ (see FIGS. 3A and 3B). Appropriate changes of the mass flow rate are used to increase the flow transition margins.

While acceleration to cruise (FIGS. 1A and 1B) requires increase of mass flow rate and reduction of flap angle deflections, mass flow rate increase shifts the transition point (to flow attachment) to larger flap angle deflections. Here, ensuring adequate flow transition margins requires pushing the flaps 2a at comparatively low air speeds. In a preferred embodiment, the push-through movement of the propulsion unit 2 is controlled by changing the flap angle of the propulsion unit 2 in a predetermined time through the "forbidden zone" (see FIG. 1A). Optionally, the mass flow rate of the engine is controlled to support the push-through movement. As exemplarily shown in FIG. 1B, the propulsion unit 2 of the outboard canard flap is pushed through the "forbidden zone" while increasing the mass flow rate. This is advantageous, as the attached condition of the outboard canard flap after pushing through the "forbidden zone" is achieved earlier. In other words, the flap angle change during the push-through is reduced as the flap angle $\delta_f$ of the propulsion unit 2 after pushing through the forbidden zone is allowed to be higher (see FIG. 1A, dotted line). Further, the mass flow rate $C_\mu$ of the middle and inboard canard flaps is reduced at the same time. This control logic is applied to compensate for the implications of pushing the outboard canard flap through the forbidden zone on lift and drag. The same principle is applied when pushing the middle canard flap or the inboard canard flap through the "forbidden zone." The same logic is applied during backward transition as shown exemplarily in FIGS. 2A and 2B. Further, the same logic may be applied to the main wing 4 wherein the direction and the sequence of the push-through may be different, e.g., starting with the inboard main wing flap.

While deceleration to hover (FIGS. 2A and 2B) requires decrease of mass flow rate and increase of flap angle deflections, mass flow rate decrease shifts the transition point (to flow separation) to smaller flap angle deflections. Here, ensuring adequate flow transition margins requires pushing the flaps at comparatively high air speeds.

Figures 1A, 1B:
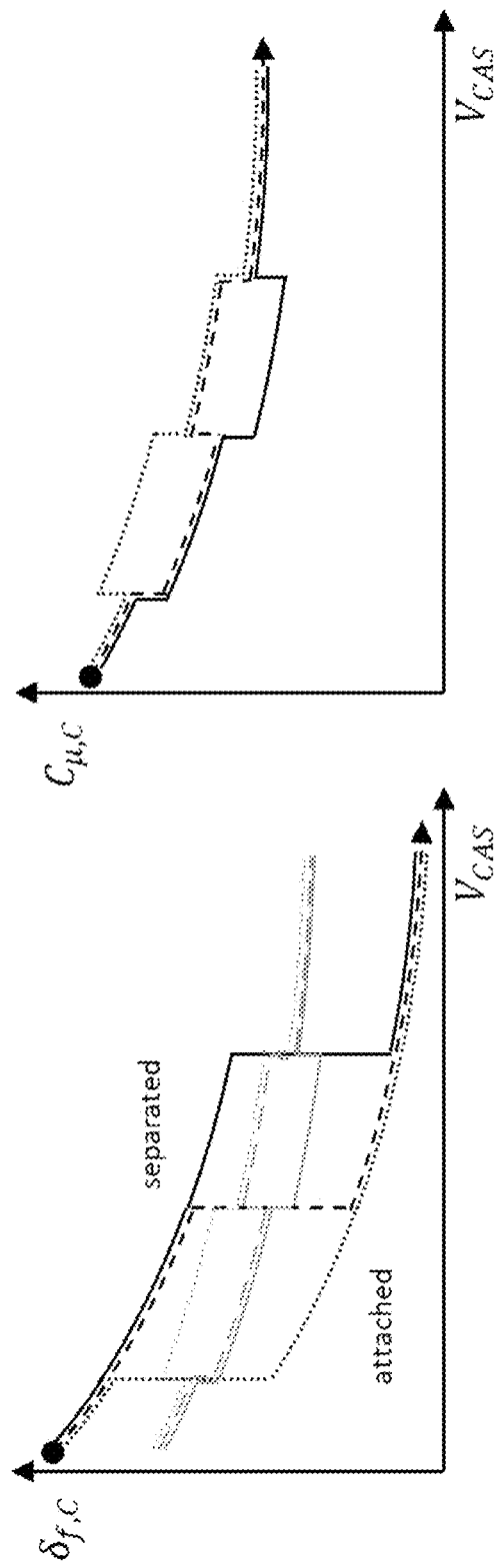
FIGS. 1A, 1B, 2A and 2B are graphs exemplarily showing a dependence of the flap angle $\delta_{f,C}$ (ordinate axis) on the calibrated air speed $V_{CAS}$ (abscissa axis), and the non-dimensional mass flow rate $C_{\mu,C}$ (ordinate axis) on the calibrated air speed $V_{CAS}$ (abscissa axis), when using a control method according to the present disclosure during forward (hover-to-cruise) transition (FIGS. 1A and 1B) and backward (cruise-to-hover) transition (FIGS. 2A and 2B)
Figures 2A, 2B:
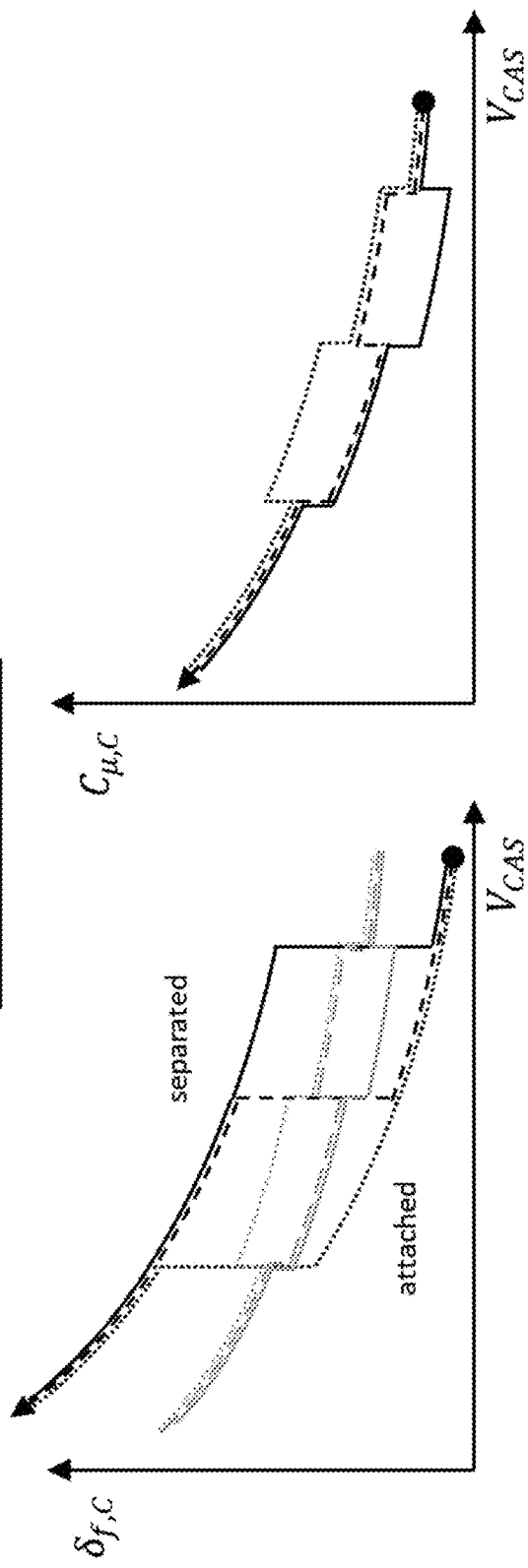

FIGS. 1A and 2A show a possible relationship between the calibrated air speed $V_{CAS}$ of the aircraft 1 and the flap angles $\delta_{f,C}$ of the three (inboard, middle and outboard) propulsion units 2 distributed along one canard 3 of the aircraft 1 when using a control method according to the present disclosure during the forward transition from hover flight to cruise flight (FIG. 1A) or during the backward transition from cruise flight to hover flight (FIG. 2A). On the other hand, FIGS. 1B and 2B show a possible relationship between the calibrated air speed $V_{CAS}$ in [m/s] of the aircraft 1 and the non-dimensional mass flow rate $C_\mu$ of the three (inboard, middle and outboard) canard propulsion units 2 during the forward transition from hover flight to cruise flight (FIG. 1B) and during the backward transition from cruise flight to hover flight (FIG. 2B). FIGS. 1A to 2B show that the flow transition regime is a function of the flap angle and the mass flow rate. In addition, however, the flow transition regime is also influenced by the angle of attack of the aircraft 1, which is assumed to have a certain constant value in each case. In response to the changing boundary conditions, the airflow on the canard propulsion units 2 transitions from a typically attached flow condition (during cruise flight) to a typically non-attached flow condition (during hover flight) and vice versa.

However, as can be seen from FIGS. 1A to 3B, there is an intermediate region (flow transition regime) between the region of the separated operating regime (in which the airflow is separated from the respective propulsion unit 2) and the region of the attached operating regime (in which the airflow is attached to the respective propulsion unit 2), where steady-state operation should be avoided due to uncertainties regarding the flow condition.

The present disclosure achieves the means to avoid (continuous) operation within this forbidden zone of the flow transition regime, thus yielding adequate controllability of the aircraft 1 throughout the transition phase without imposing limitations onto the operation of the aircraft 1. In this context, the present disclosure is based on a consecutive push-through concept, according to which propulsion units 2 (or groups G1, G2, G3, G4, G5 of multiple propulsion units 2, as in FIGS. 3A-3B) are consecutively, i.e., one after the other, pushed (maneuvered) through the transition regime from a separated operating regime to an attached operating regime (in the case of acceleration to cruise flight, as in FIGS. 1A and 1B) and vice versa (in case of decelerating to hover flight, as in FIGS. 2A and 2B).

Although FIGS. 1A to 2B illustrate this push-through concept in terms of the canard trim states (the canard flap angles $\delta_{f,C}$ and the non-dimensional mass flow rate $C_{\mu,C}$) over the calibrated air speed $V_{CAS}$, the same relationship applies analogously to the other propulsion units 2 distributed along the main wings 4 of the aircraft 1 (see FIG. 4). Thus, in each case, the propulsion units 2 are either in an operating regime with reliably attached flow or in an operating regime with reliably separated/detached flow, but never in between, which is referred to as the unstable flow condition zone (forbidden zone of the transition regime).

This unstable flow condition zone in between is circumvented by dynamically pushing the propulsion units 2 (or the groups G1, G2, G3, G4, G5 of propulsion units 2) from one operating regime to the other within a predetermined time period. While a fraction of the flap bank is being pushed, the other flaps 2a remain in their present operating regime, thus ensuring adequate controllability. The term "push" in the above and following discussion refers to a sudden change in the controllable parameters of the respective propulsion unit 2, i.e., in its flap angle $\delta_f$ and/or fan speed (engine speed), which may not exceed a predetermined time period.

Accordingly, the forbidden zone is a range of flap angle $\delta_f$ and fan speed (engine speed) combinations for which there is insufficient certainty about the present flow state. It is not possible to compute with accuracy whether the flow in this forbidden zone is attached, separated or about to change from one flow condition to the other. The uncertainty of the flow condition within this forbidden zone poses a fundamental risk to the controllability of the aircraft 1 and should therefore be avoided.

The vertical downward steps of the flap angle $\delta_{f,C}$ at three distinct calibrated air speeds $V_{CAS}$ in FIGS. 1A and 2A represent the points at which the three propulsion units 2 (inboard, middle and outboard canard propulsion units 2, see FIG. 4) are individually pushed from the separated operating regime to the attached operating regime during the transition from hover flight to cruise flight. However, it should be reiterated that the preceding explanation does not imply that the push-through events are triggered by a certain air speed condition.

Although not illustrated, some of the propulsion units 2 may be continuously moved to small flap angles $\delta_f$ already at low air speeds without having to penetrate the unstable flow condition zone. This is possible as the impact of flow condition changes in the low speed regime (i.e., low dynamic pressure) on the generated forces and moments are insignificant.

The non-dimensional mass flow rate $C_{\mu,C}$ represented at the ordinate axis of FIGS. 1B and 2B serves to express the blowing performance of the propulsion unit 2 and is calculated by the following general equation:

$$C_\mu = \frac{\dot{m} \times v}{q_\infty \times S},$$

where $\dot{m}$ is the air mass flow rate of the engine, v is the air outlet velocity of the engine, $q_\infty$ is the dynamic pressure of the freestream, and S is a reference area (in this case, the wing area S). Thus, the non-dimensional mass flow rate $C_\mu$ increases with the mass flow rate, $\dot{m}$, which, in turn, increases with the engine speed n in [rpm].

The consecutive push-through of the propulsion units 2 (inboard, middle and outboard propulsion units) in FIGS. 1B and 2B, which in accordance with FIGS. 1A and 2A corresponds to a vertical upward or downward step of the non-dimensional mass flow rate $C_{\mu,C}$ of the respective propulsion unit 2 caused by a sudden increase or decrease of the mass flow rate $\dot{m}$ of the respective engine, can preferably be triggered as a function of the flow transition margin. These consecutive mass flow rate changes as shown in FIGS. 1B and 2B can be used advantageously in both forward and backward transition to increase the flow transition margins at a given flap angle $\delta_f$, thus reducing the required flap angle spread between separated and attached flaps 2a and 2b.

According to FIGS. 1A to 2B, all (inboard, middle and outboard) canard propulsion units 2 eventually reach a common uniform flap angle $\delta_f$ and non-dimensional mass flow rate $C_\mu$ (and thus mass flow rate $\dot{m}$) in cruise flight.

Figure 3A:
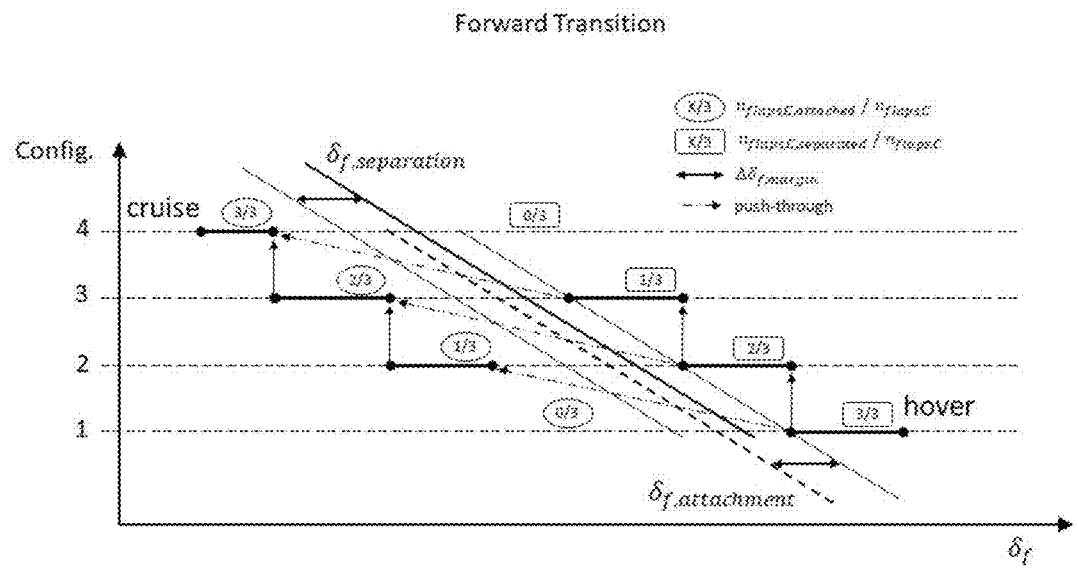
FIGS. 3A and 3B are graphs showing the relationship between the flap angle $\delta_f$ (abscissa axis) and the different configurations (ordinate axis) corresponding to a ratio $n_{flaps,C,attached}/n_{flaps,C}$ between the number of canard flaps in the attached operating regime and the total number of canard flaps and a ratio $n_{flaps,C,separated}/n_{flaps,C}$ between the number of canard flaps in the separated operating regime and the total number of canard flaps, when using a control method according to the present disclosure during forward (hover-to-cruise) transition (FIG. 3A) and backward (cruise-to-hover) transition (FIG. 3B)
Figure 3B:
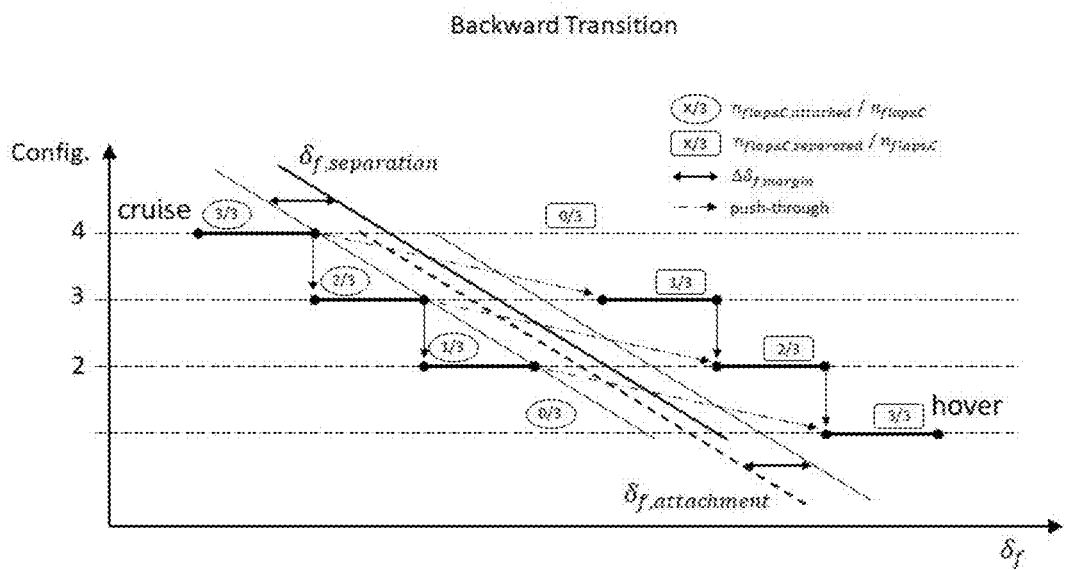

FIGS. 3A and 3B serves to comprehensively visualize the push-through logics. These FIGS. 3A and 3B indicate that flaps 2a are pushed as a function of the flow transition margin (based on the current mass flow rate and angle of attack). In forward transition (represented in FIG. 3A), the proximity of flaps 2a in separated operating regime to the transition line from separated flow to attached flow triggers the push-throughs, whereas, in backward transition (represented in FIG. 3B), the proximity of flaps 2a in attached operation regime to the transition line from attached flow to separated flow triggers the push-throughs.

The control of the propulsion units 2 (each comprising an arbitrary number of engines, e.g., electric ducted fans 2b, see FIG. 4) could be compared to a "gearbox" as a function of the control authority demand, i.e., the command determined by the control loop technology, which in turn changes with speed, flight path angle, translational acceleration, etc. For example, during the acceleration from hover flight to cruise flight (see FIG. 3A), a first "gear shift" is triggered as a function of the flow condition at a first one of the three propulsion units 2 reaching an adequate, predetermined flow transition margin (flow attachment margin $\delta_{f,attachment}$). During this "gear shift," the first of the three propulsion units 2 is pushed from the separated operating regime to the attached operating regime, i.e., it is pushed through the unstable flow condition zone (forbidden zone). In the considered exemplary application of the present disclosure, this is achieved by means of a dynamic reduction of the flap angle $\delta_{f,C}$ of the propulsion unit 2 (combined with a dynamic increase of the engine speed/mass flow rate $\dot{m}$ and thus non-dimensional mass flow rate $C_{\mu,C}$ of the very same propulsion unit 2). When the flow condition at another, second of the three propulsion units 2 reaches the adequate, predetermined flow transition margin (flow attachment margin $\delta_{f,attachment}$), this second of the three propulsion units 2 is pushed from the separated operating regime to the attached operating regime. Finally, when the flow condition at still another, third of the three propulsion units 2 reaches the adequate, predetermined flow transition margin (flow attachment margin $\delta_{f,attachment}$), this third of the three propulsion units 2 is pushed from the separated operating regime to the attached operating regime. The same applies, of course, in the reverse direction during the transition from cruise to hover, with the proviso that the corresponding flow transition margin mentioned earlier is here a flow separation margin $\delta_{f,separation}$ (see FIG. 3B).

The analogy of the concept of consecutive push-through according to the present disclosure with a "gearbox" makes it possible to sub-divide the flight phase transition (from hover to cruise and vice versa) into several "gear shift" sub-phases. For example, in FIG. 3A, a first sub-phase of the flight phase transition (in which none of the canard flaps 2a has been pushed to the attached operating regime) would correspond to a "first gear," a subsequent second sub-phase (in which one of the canard flaps 2a has been pushed to the attached operating regime) would correspond to a "second gear," a subsequent third sub-phase (in which two of the canard flaps 2a have been pushed to the attached operating regime) would correspond to a "third gear," and finally a fourth sub-phase (in which all three of the canard flaps 2a have been pushed to the attached operating regime) would correspond to a "fourth gear."

As can further be clearly seen in FIGS. 3A and 3B, the successive push-through of the three propulsion units 2 through the forbidden zone of the flap angles $\delta_f$ (the push-through movement is marked with a dashed-and-dotted arrow in each case) will account for some hysteresis.

The concept of consecutive (sequential) push-through according to the present disclosure can be applied not only to individual propulsion units 2 (i.e., one propulsion unit 2 at a time), but preferably also to appropriately selected groups of multiple propulsion units 2. The combination of a consecutive push-through concept with an appropriate flap grouping concept is illustrated in FIG. 4. The total of sixteen propulsion units 2 (six on the canards 3 and ten on the main wings 4) are divided into a total of five groups of propulsion units 2, framed by differently shaded rectangular boxes in FIG. 4 and labeled G1, G2, G3, G4 and G5. Each propulsion unit 2 comprises one flap 2a into which two engine-driven fans are integrated, with the exception of the main wing inboard propulsion units 2 (which form groups G1 and G2), each of which consists of one flap 2a with only one integrated engine-driven fan.

During the transition from hover to cruise flight—as symbolized by the thick arrows in FIG. 4—first the group G3 of propulsion units 2, then the group G4 of propulsion units 2, then, the group G5 of propulsion units 2, then the group G2 of propulsion units 2, and finally the group G1 of propulsion units 2 are dynamically pushed (maneuvered) from a separated to an attached operating regime analogous to FIGS. 1A to 2B by controlling the flap angles $\delta_f$ and non-dimensional mass flow rates $C_\mu$ (fan speeds), accordingly. The reverse control sequence occurs during the transition from cruise to hover flight.

In the above-described embodiment, corresponding to the configuration illustrated in FIG. 4, the main wing inboard propulsion units 2 forming groups G1 and G2 are also used as airbrakes. Hence, during backward transition they need to be pushed to the separated flow regime first, and consequently they are pushed to the attached flow regime during forward transition last. However, in deviation from this configuration, an alternative embodiment is also conceivable in which the main wing propulsion units 2 are all pushed in succession from inboard to outboard into the attached regime during the forward transition and all pushed in succession from outboard to inboard into the separated regime during the backward transition.

The scheduling of the push-through events as a function of the propulsion unit grouping, exemplified in FIG. 4, advantageously allows the push-through events to be triggered symmetrically (in the aircraft's left-right direction Y) about the longitudinal center line of the aircraft 1, thus keeping lateral-directional disturbances to a minimum. In addition, this scheduling advantageously allows to couple push-through events on the canards 3 and the main wings 4 (in the aircraft's fore-aft direction X), thus balancing transition-induced pitch disturbances to a large degree. As a result, the negative impacts of local (asymmetric) push-through events can be eliminated by grouping the propulsion units 2 in such a way as proposed in FIG. 4.

The present disclosure ensures that steady-state operation of the propulsion units 2 (flaps 2a/ducted fans 2b) within the flow transition regime is prevented. However, this is not achieved by the aircraft 1 (and thus the propulsion units 2) being maneuvered dynamically through the flow transition regime as a whole, but by the propulsion units 2 being maneuvered through the flow transition regime consecutively, i.e., in a specific sequence, one propulsion unit 2 or group G1, G2, G3, G4, G5 of propulsion units 2 after the other. Therefore, despite preventing steady-state operation of the propulsion units 2 within the unstable flow condition zone (forbidden zone of the flow transition regime), the approach allows the aircraft 1 to have steady and controlled flight over the whole flight phase transition. Since the flaps 2a/ducted fans 2b always avoid operation within the flow transition regime with uncertain flow conditions (attached flow, or separated flow, or transitory flow), the aircraft 1 is enabled to steadily operate at any flight sub-phase within the flight phase transition.

The consecutive maneuvering of propulsion units 2 through this flow transition regime is achieved by using a sequence of push-through configurations. In accordance with FIGS. 3A and 3B, each push-through configuration is characterized by a certain allocation of propulsion units 2 (flaps 2a/ducted fans 2b) to the separated operating regime and the attached operating regime. This means that each propulsion unit 2 (flap 2a/ducted fan 2b) operates within an operating regime in which its flow condition is either separated or attached to an adequate level of confidence. It is recommendable, but not required to operate all separated propulsion units 2 of a wing 3, 4 at a common flap angle $\delta_f$ and a common engine operating point as well as to operate all attached propulsion units 2 of a wing 3, 4 at a common flap angle $\delta_f$ and a common fan speed (engine operating point). In hover and cruise flight, i.e., at adequate distance from the transition regime, all propulsion units 2 (flaps 2a/ducted fans 2b) per canard 3 or main wing 4 can be operated uniformly at a common flap angle $\delta_f$ and a common fan speed (engine operating point).

As shown in FIG. 3A, during forward transition from hover flight to cruise flight, the distance of the propulsion unit operating point from the flow attachment point decreases. This distance from the flow attachment point is called the flow attachment margin. If this flow attachment margin falls to a predetermined flow attachment margin, a configuration change—a so-called push-through event—is triggered before unintentional flow attachment can occur at uniform propulsion units 2. During the configuration change, a number of propulsion units 2 is dynamically pushed from the separated flow regime to the attached flow regime, thus overleaping the flow transition regime, i.e., the regime of propulsion unit operating conditions with insufficient certainty on the flow condition. The control method ensures that the new attached operating regime has an adequate distance from the flow separation point (referred to as the flow separation margin), wherein both the flow attachment margin and the flow separation margin are flow transition margins. By re-allocating some of the previously separated propulsion units 2 to the attached flow regime, the push-through configuration change also increases the flow attachment margin of the remaining separated propulsion units 2.

However, as the aircraft 1 accelerates further, the flow attachment margin will again decrease, eventually triggering the next push-through configuration change. Again, a number of propulsion units 2 is pushed from the separated operating regime to the attached operating regime. This approach is repeated until all propulsion units 2 have been pushed to the attached operating regime, hence being uniformly operated with attached flow and an adequate flow separation margin. When decelerating the aircraft 1 from cruise flight to hover flight, the above-discussed sequence of aircraft configuration changes is applied in the opposite direction.

Each aircraft configuration change represents a piecewise alignment of the aircraft 1 with the altering aerodynamic characteristics throughout the flight phase transition from hover flight to forward cruise flight and vice versa.

Strictly avoiding steady-state operation of propulsion units 2 within the flow transition regime ensures adequate knowledge of the present aerodynamic characteristics. The airflow on the propulsion units 2 (which simultaneously function as the lift generating surfaces) is either certainly separated or certainly attached. As a consequence, the flight control laws can be designed for a certain control effectiveness and do not have to account for large control effectiveness variations, which significantly improves the robustness margins and the controllability during the flight phase transition. Control inversions, a situation where the effect of a propulsion unit 2 inverts sign, can also be avoided in the process.

A push-through configuration change by means of a push-through event may be triggered as a function of the flow transition margins of both the separated and the attached group G1, G2, G3, G4, G5 of propulsion units 2.

FIG. 4 shows an exemplary embodiment of the push-through concept with groups G1, G2, G3, G4, G5 of flaps 2a pushing through consecutively. (Note: The trailing numbers in the reference signs of the groups do not indicate the order in which they are pushed through.) As highlighted in this FIG. 4, a push-through configuration change may trigger simultaneous re-allocation of propulsion units 2/lift generating surfaces (from separated flow to attached flow or vice versa) on multiple wings 3, 4.

FIG. 4 indicates with bold arrows the push-through sequence. It is emphasized that it is preferable to align this push-through sequence with the natural local angle of attack distribution across the wing bank. The depicted push-through sequence during a flight phase transition from hover to cruise consists of pushing-through the propulsion units 2 on the canards 3 consecutively in a direction from outboard to inboard and simultaneously pushing-through the propulsion units 2 on the main wings 4 consecutively in a direction from inboard to outboard (except for the two inboard propulsion units 2 on the main wings 4, which form groups G1 and G2).

The reason for adopting the above push-through sequence is that, on the canards 3, the canard tip vortices induce a reduced angle of attack on the outboard flaps 2a, i.e., the downwash effect reducing the effective angle of attack, and that, on the main wings 4, the canard vortices induce a reduced angle of attack on the inboard flaps 2a (and an increased angle of attack on the outboard flaps 2a).

Furthermore, as already outlined above, during backward transition from cruise to hover, the groups G1, G2 of the propulsion units 2, located furthest inboard on the main wing 4, are the first to be pushed through. This advantageously opens up the possibility to use the push-through maneuvers in a manner such as to deploy the inboard main wing flaps 2a as airbrakes.

In order to allow for rejected transitions where the aircraft only transitions to mid speed and then reverts to hover flight, or only decelerates from cruise to mid speed and then reverts to cruise flight, it is desirable (but not mandatory) for the propulsion units (2) to be always pushed through the unstable flow condition zone in the same sequence during forward transition from hover flight to cruise flight, and to be always pushed through the unstable flow condition zone in the same sequence reverse to that of the forward transition during the backward transition from cruise flight to hover flight.

Also, FIG. 4 demonstrates the synchronization of push-through maneuvers on both sides (in left-right direction Y) of the aircraft 1 so as to minimize lateral-directional disturbances, as well as on the canards 3 and main wings 4 (in fore-aft direction X) of the aircraft 1 so as to balance transition-induced pitch disturbances. The control method according to the present disclosure allows for transition of the aircraft 1 through the flow transition regime while operating the propulsion units 2 used for (feedback) control of the aircraft 1 in a known flow operating regime (with a known flow condition) at all times. This offers the fundamental technical advantage that robust control/controllability of the aircraft 1 during the flight phase transition is achieved without imposing limitations onto the operation of the aircraft 1 and without having to specifically adapt the aircraft design for this flight phase transition. In addition, compared to actuating all flaps 2a at the same time the increase/decrease of lift/drag can be controlled in a stepwise manner.

By maneuvering the aircraft 1 through the flow transition regime as described above, the present disclosure allows the aircraft design to be oriented primarily toward flight performance, i.e., hover and cruise flight efficiency, noise reduction, and safety. Therefore, the economic advantage of the present disclosure is the ability to manage the flow transition phenomena despite the economic (highly efficient) aircraft/propulsion unit design. In contrast, other VTOL aircraft show a reduced cruise flight efficiency as a consequence of the aircraft design being significantly compromised in favor of the transition capability. Hence, the control method according to the present disclosure helps to achieve higher flight ranges (both from runway take-off or in VTOL) and higher cruise speeds, as are required for regional air transport services.

LIST OF REFERENCE SIGNS

1 eVTOL aircraft
2 propulsion unit
2a flap
2b engine (electric ducted fan)
3 canards
4 main wings
5 mounting portion
G1, G2, G3
G4, G5 groups of propulsion units
X fore-aft direction of aircraft
Y left-right direction of aircraft
$C_\mu$ non-dimensional mass flow rate
$V_{CAS}$ calibrated air speed
$\delta_f$ flap angle
$\delta_{f,attachment}$ flow attachment margin (flow transition margin)
$\delta_{f,separation}$ flow separation margin (flow transition margin)

What is claimed is:
1. A method for controlling a transition of a vertical take-off and landing aircraft from hover flight to cruise flight and vice versa, the method comprising:
   operating the aircraft in a hover flight configuration by sending a first command signal to propulsion units of the aircraft to operate in a separated operating regime, the propulsion units of the aircraft, each, comprising:
      a flap configured as a lifting and control surface, and
      at least one engine connected to the flap,
      the propulsion units being individually controllable propulsion units, and the propulsion units being mounted in a movable manner about at least one degree of freedom;

transitioning the aircraft from hover flight configuration to a cruise flight configuration, wherein the transitioning comprises:

sending a second command signal to a first group of the propulsion units to push the first group of propulsion units through an unstable flow condition zone to an attached operating regime within a predetermined time period, wherein the pushing comprises:

changing the flap angle of the propulsion units, and wherein the unstable flow condition zone is a zone of flap angles where there is a regime with unstable flow conditions;

maintaining a second group of the propulsion units in the separated operating regime while the first group of propulsion units is pushed through the unstable flow condition zone, and sending a third command signal to the second group of the propulsion units to push the second group of the propulsion units through the unstable flow condition zone to the attached operating regime within the predetermined time period; and operating the aircraft in a cruise flight configuration with the propulsion units in the attached operating regime.

2. The method of claim 1, wherein the engine is an electric ducted fan.

3. The method of claim 1, wherein the pushing of a propulsion unit through the unstable flow condition zone is performed such that the flap angle of the propulsion unit has an adequate flow transition margin from the unstable flow condition zone, which is a flap angle distance of +/−2 to 10° from an upper limit or lower limit of the unstable flow condition zone corresponding to a flow separation or attachment point.

4. The method of claim 3, wherein the adequate flow transition margin from the unstable flow condition zone is a flap angle distance of +/−4 to 8° from the upper limit or lower limit of the unstable flow condition zone corresponding to the flow separation or attachment point.

5. The method of claim 4, wherein the adequate flow transition margin from the unstable flow condition zone is a flap angle distance of +/−6 to 7° from the upper limit or lower limit of the unstable flow condition zone corresponding to the flow separation or attachment point.

6. The method of claim 1, wherein the pushing of a propulsion unit through the unstable flow condition zone comprises dynamically decreasing or increasing the flap angle of the propulsion units.

7. The method of claim 1, wherein the pushing of a propulsion unit through the unstable flow condition zone comprises dynamically increasing or decreasing the respective engine speed or speeds of the propulsion units and thus dynamically increasing or decreasing the mass flow rate in the propulsion units.

8. The method of claim 1, wherein the first group of the propulsion units and the second group of the propulsion units each comprise symmetrically arranged propulsion units about a longitudinal center line of the aircraft.

9. The method of claim 1 wherein the aircraft comprises forward canards and main wings, the propulsion units are distributed on the canards and the main wings to provide vectored thrust, the first group of the propulsion units comprises at least one propulsion unit on the forward canards and on the main wings, the second group of the propulsion units comprises at least one propulsion unit on the forward canards and on the main wings, and the pushing of the first group of the propulsion units and the second group of the propulsion units through the unstable flow condition zone from the separated operating regime to the attached operating regime balances transition-induced pitch disturbances.

10. The method of claim 9, wherein the second group of the propulsion units comprises propulsion units that are located outboard from propulsion units of the first group of propulsion units.

11. The method of claim 9, wherein the propulsion units comprise:

an inboard propulsion unit, a middle propulsion unit, and an outboard propulsion unit on each of the forward canards; and an inboard propulsion unit, an inner middle propulsion unit, a middle propulsion unit, an outer middle propulsion unit, and an outboard propulsion unit on each of the main wings, wherein the first group of the propulsion units comprises the middle propulsion units of the main wings and the outboard propulsion units of the forward canards, and wherein the second group of the propulsion units comprises the outer middle propulsion units of the main wings and the middle propulsion units of the forward canards.

12. The method of claim 11, wherein the transitioning further comprises:

maintaining a third group of propulsion units in the separated operating regime while the second group of propulsion units is pushed through the unstable flow condition zone, the third group of propulsion units comprising the outboard propulsion units of the main wings and the inboard propulsion units of the forward canards; and sending a fourth command signal to the third group of propulsion units to push the third group of the propulsion units through the unstable flow condition zone to the attached operating regime within the predetermined time period.

13. The method of claim 12, wherein the transitioning further comprises:

maintaining a fourth group of propulsion units in the separated operating regime while the third group of propulsion units is pushed through the unstable flow condition zone, the fourth group of propulsion units comprising the inner middle propulsion units of the main wings;

sending a fifth command signal to the fourth group of propulsion units to push the fourth group of the propulsion units through the unstable flow condition zone to the attached operating regime within the predetermined time period;

maintaining a fifth group of propulsion units in the separated operating regime while the fourth group of propulsion units is pushed through the unstable flow condition zone, the fifth group of propulsion units comprising the inboard propulsion units of the main wings; and sending a sixth command signal to the fifth group of propulsion units to push the fifth group of the propulsion units through the unstable flow condition zone to the attached operating regime within the predetermined time period.

14. The method of claim 13, further comprising:
transitioning the aircraft from the cruise flight configuration to the hover flight configuration,
wherein the transitioning comprises:
pushing the first group of propulsion units, the second group of propulsion units, the third group of propulsion units, the fourth group of propulsion units, and the fifth group of propulsion units through the unstable flow condition zone from that attached operating regime to the separated operating regime in a reverse order compared to an order from the transitioning the aircraft from the hover flight configuration to the cruise flight configuration.

15. The method of claim 14, wherein transitioning the aircraft from the cruise flight configuration to the hover flight configuration comprises deploying the fourth and fifth group of propulsion units as air brakes.

16. The method of claim 1, further comprising:
transitioning the aircraft from the cruise flight configuration to the hover flight configuration, wherein the transitioning comprises:
pushing the first group of propulsion units and the second group of propulsion units through the unstable flow condition zone from that attached operating regime to the separated operating regime in reverse order compared to an order from the transitioning the aircraft from the hover flight configuration to the cruse flight configuration.

* * * * *